(No Model.) 11 Sheets—Sheet 3.
W. B. CURTISS.
MACHINE FOR BENDING AND FORMING WIRE.
No. 283,327. Patented Aug. 14, 1883.

Witnesses
J. H. M'son
A. W. Mortimer

Inventor
William B. Curtiss.
By Wooster Smith
Attys.

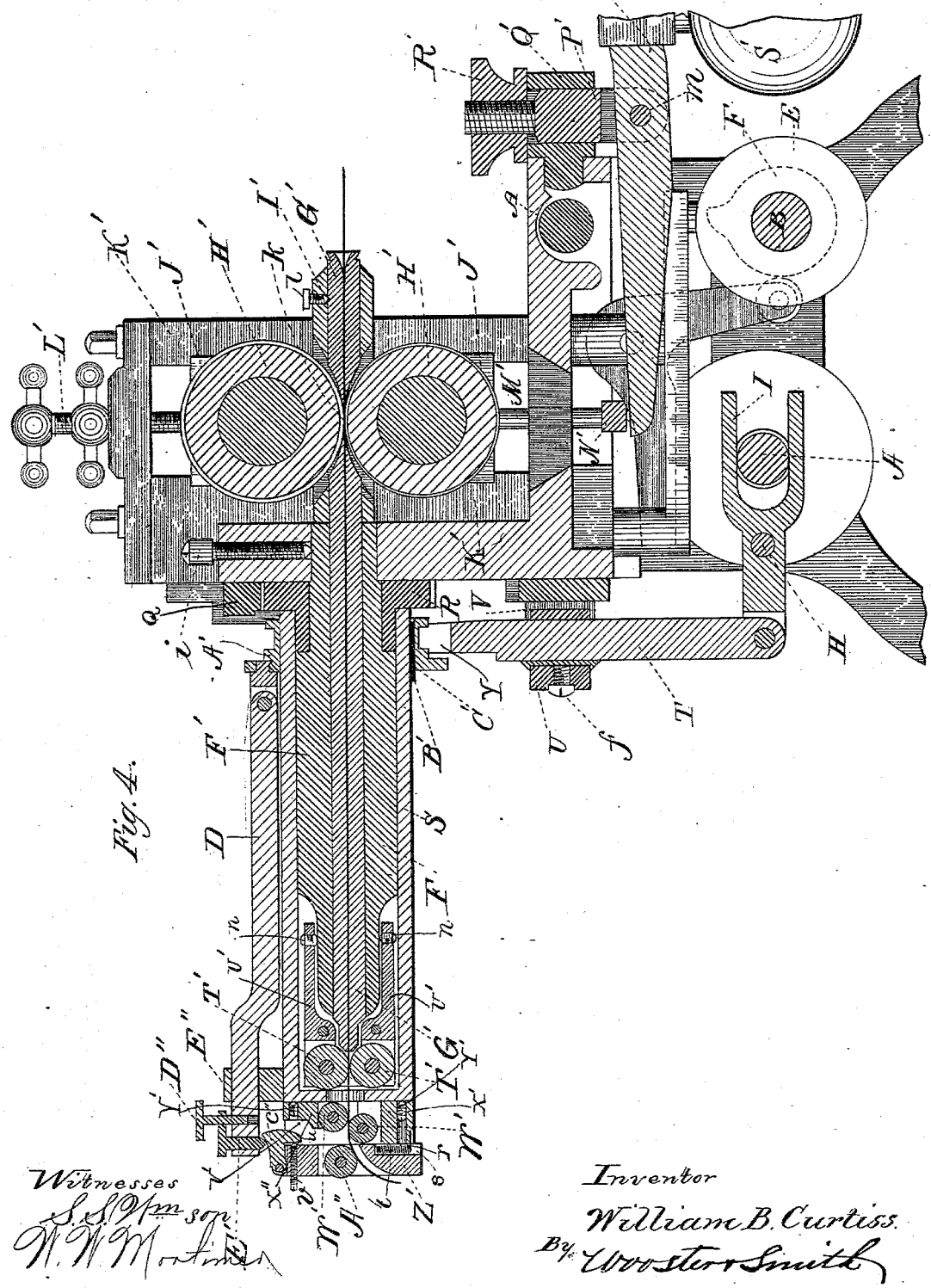

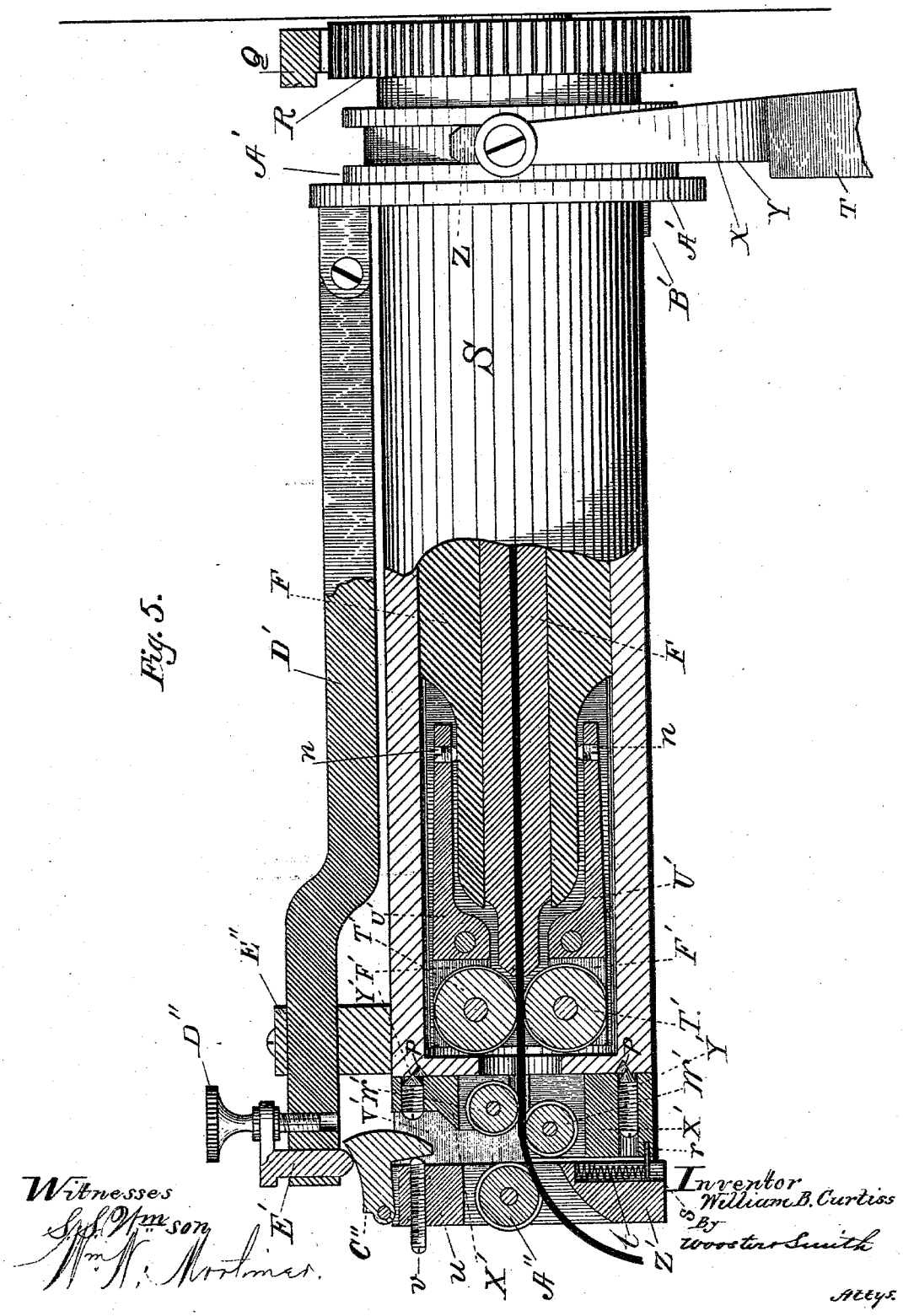

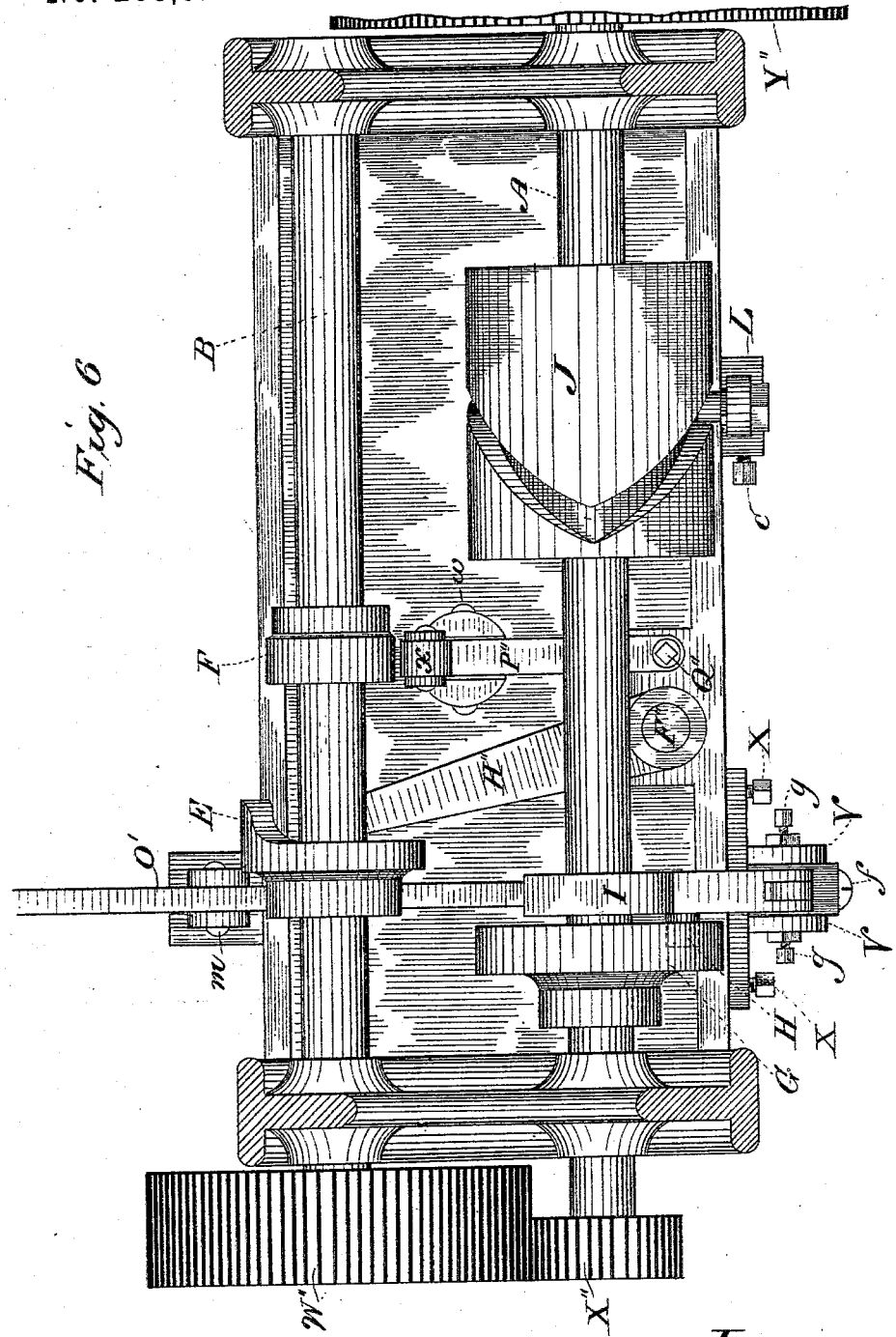

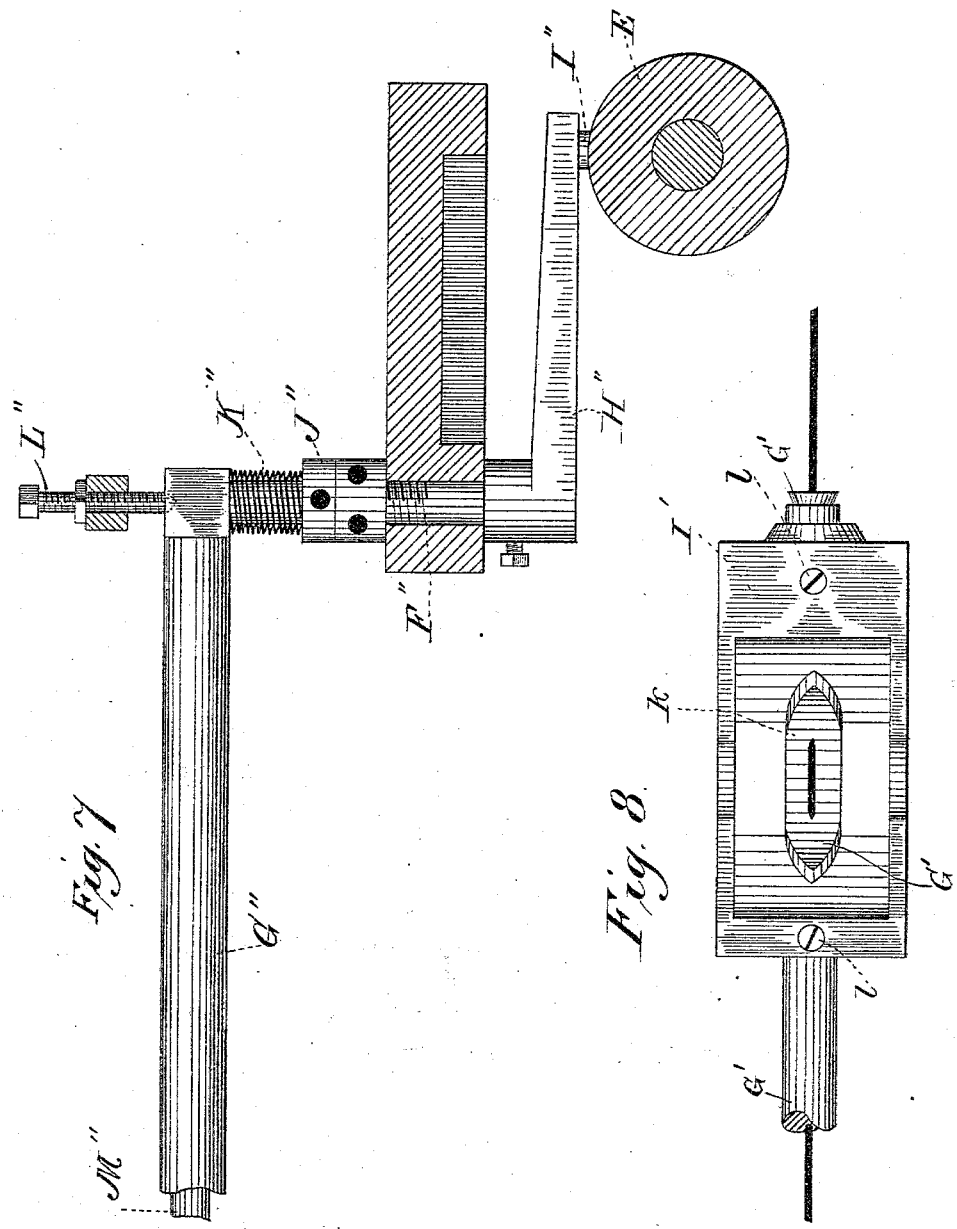

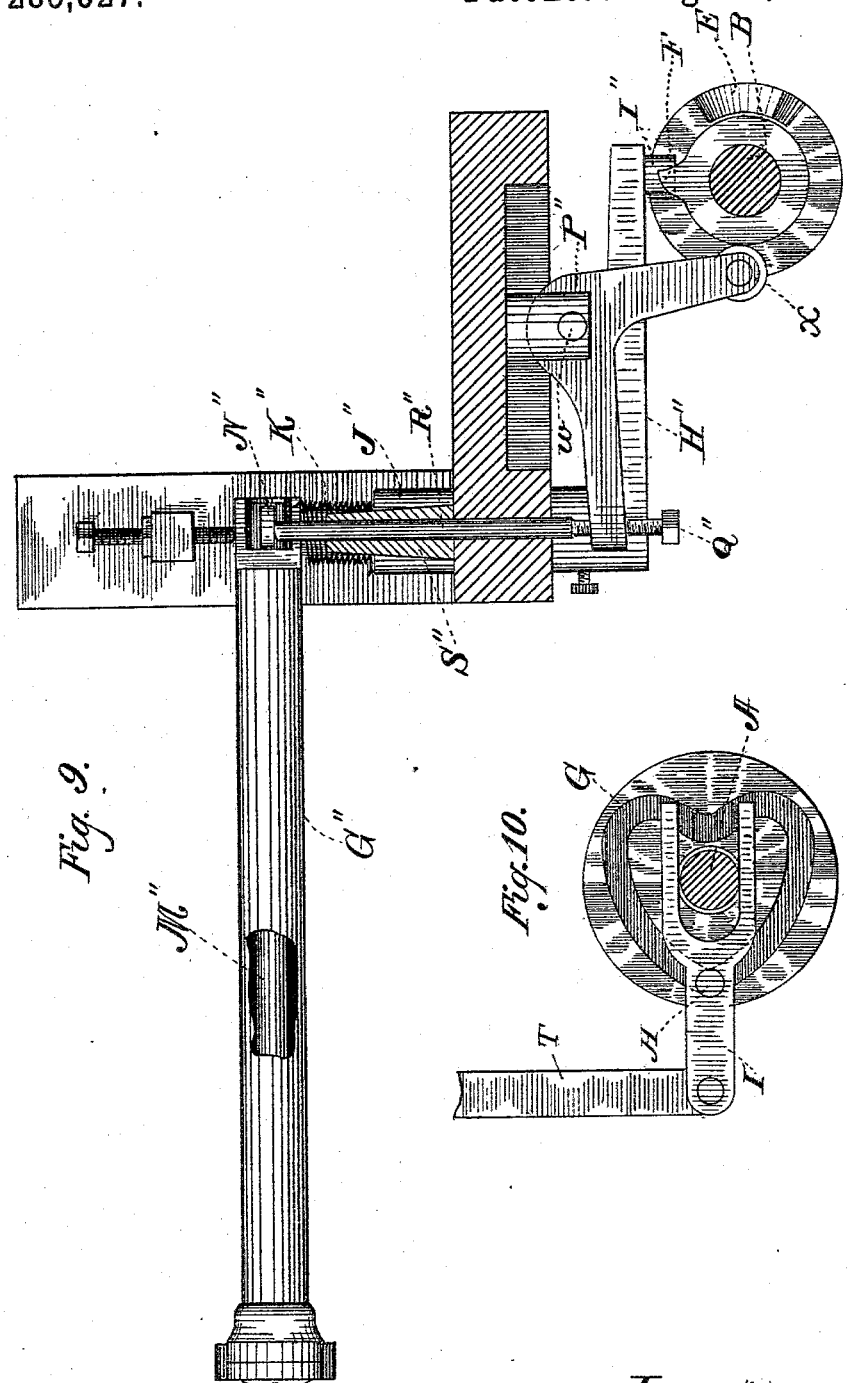

(No Model.) 11 Sheets—Sheet 9.
W. B. CURTISS.
MACHINE FOR BENDING AND FORMING WIRE.
No. 283,327. Patented Aug. 14, 1883.
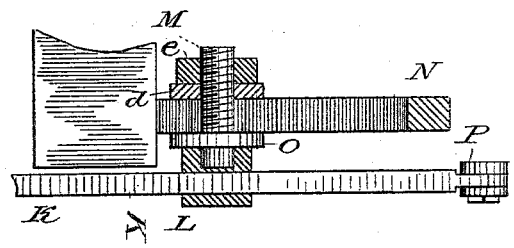
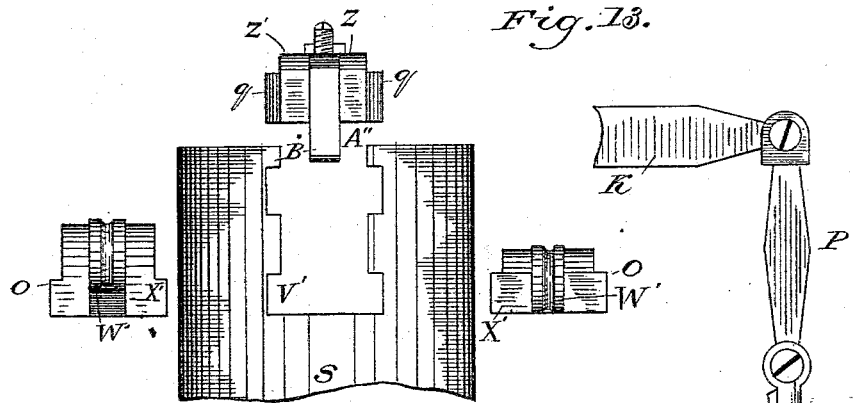
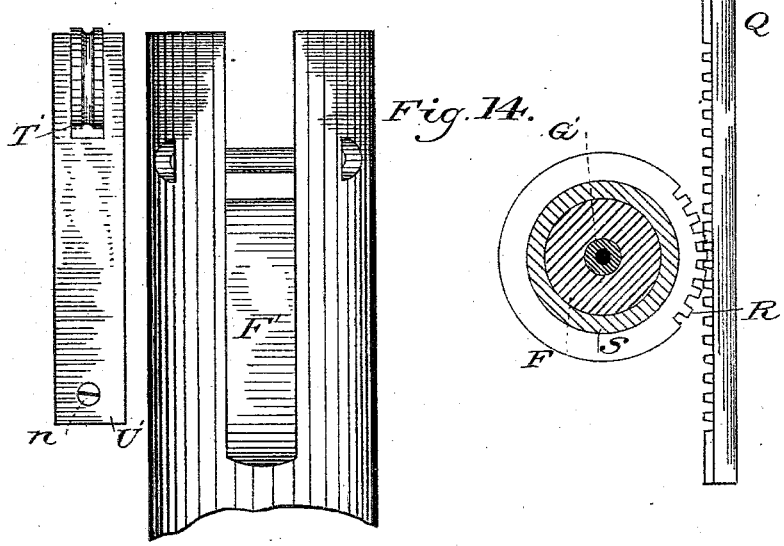
Witnesses
Inventor
William B. Curtiss
By Wooster Smith
Attys.

(No Model.) 11 Sheets—Sheet 10.
W. B. CURTISS.
MACHINE FOR BENDING AND FORMING WIRE.
No. 283,327. Patented Aug. 14, 1883.

Witnesses: Inventor:
Wm. B. Curtiss.
by Wooster & Smith
Atty's (No Model.) 11 Sheets—Sheet 11.

W. B. CURTISS.
MACHINE FOR BENDING AND FORMING WIRE.

No. 283,327. Patented Aug. 14, 1883.

Witnesses: Inventor:
Wm. B. Curtiss:
by Wooster Smith
Attys.

United States Patent Office.

WILLIAM B. CURTISS, OF DANBURY, CONNECTICUT, ASSIGNOR TO WILLIAM B. CURTIS & CO., OF SAME PLACE.

MACHINE FOR BENDING AND FORMING WIRE.

SPECIFICATION forming part of Letters Patent No. 283,327, dated August 14, 1883.

Application filed May 23, 1883. (No model.)

*To all whom it may concern:*

Be it known that I, WILLIAM B. CURTISS, a citizen of the United States, residing at Danbury, in the county of Fairfield and State of Connecticut, have invented certain new and useful Improvements in Machines for Bending and Forming Wire; and I do hereby declare the following to be a full, clear, and exact description of the invention, such as will enable others skilled in the art to which it appertains to make and use the same.

My invention relates to certain novel and useful improvements in machines for bending and forming wire, and has for its object to provide such a machine as shall bend or form wire into any desired curve or shape with or without torsion; and, with these ends in view my invention consists in the details of construction and combination of elements hereinafter fully described, and then specifically designated by the claims.

In order that those skilled in the art to which my invention appertains may more fully understand its construction and operation, I will proceed to describe the same in detail, referring by letter to the accompanying drawings, forming a part of this specification, in which—

Figure 1:
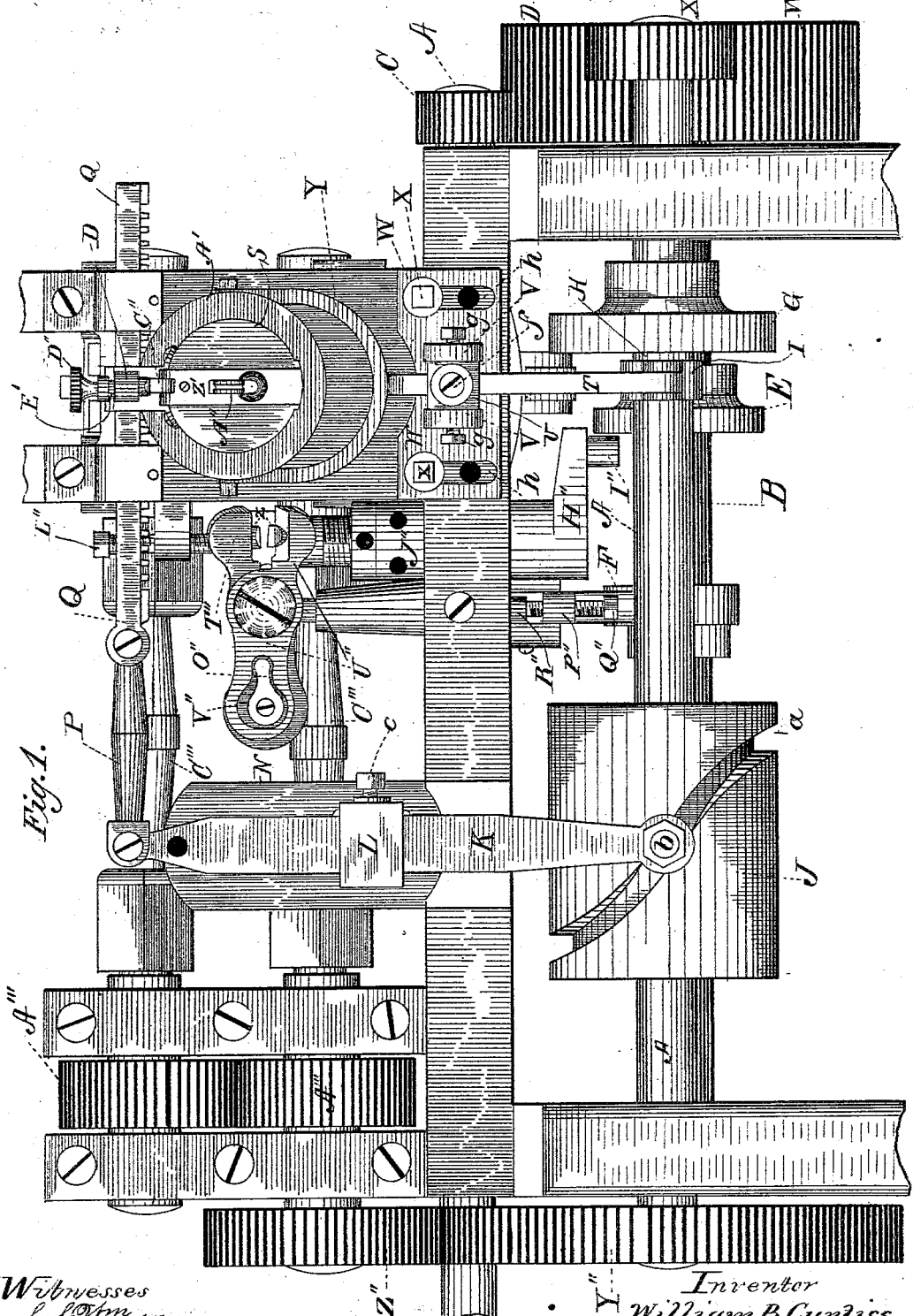
Figure 2:
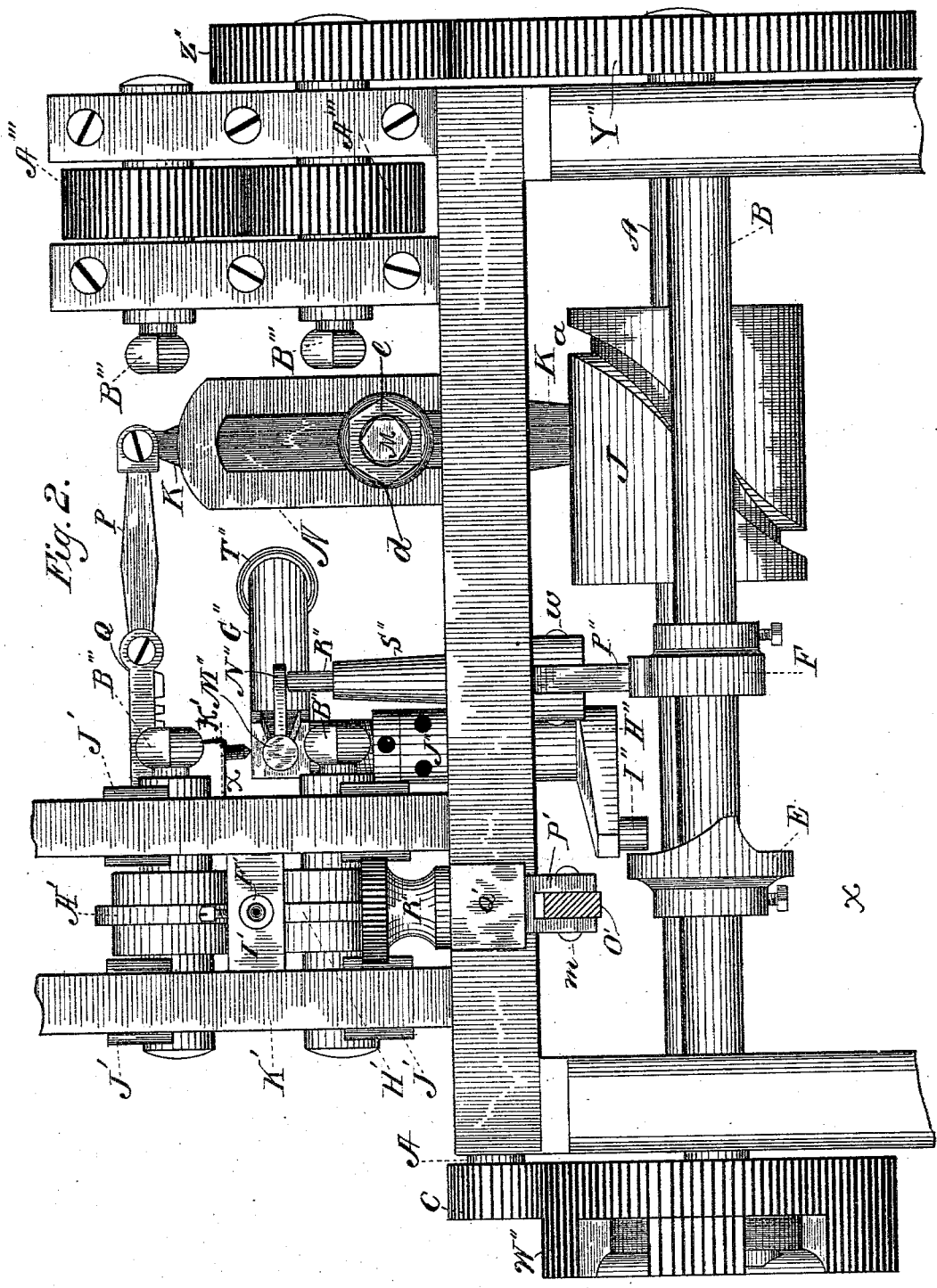
Figure 3:
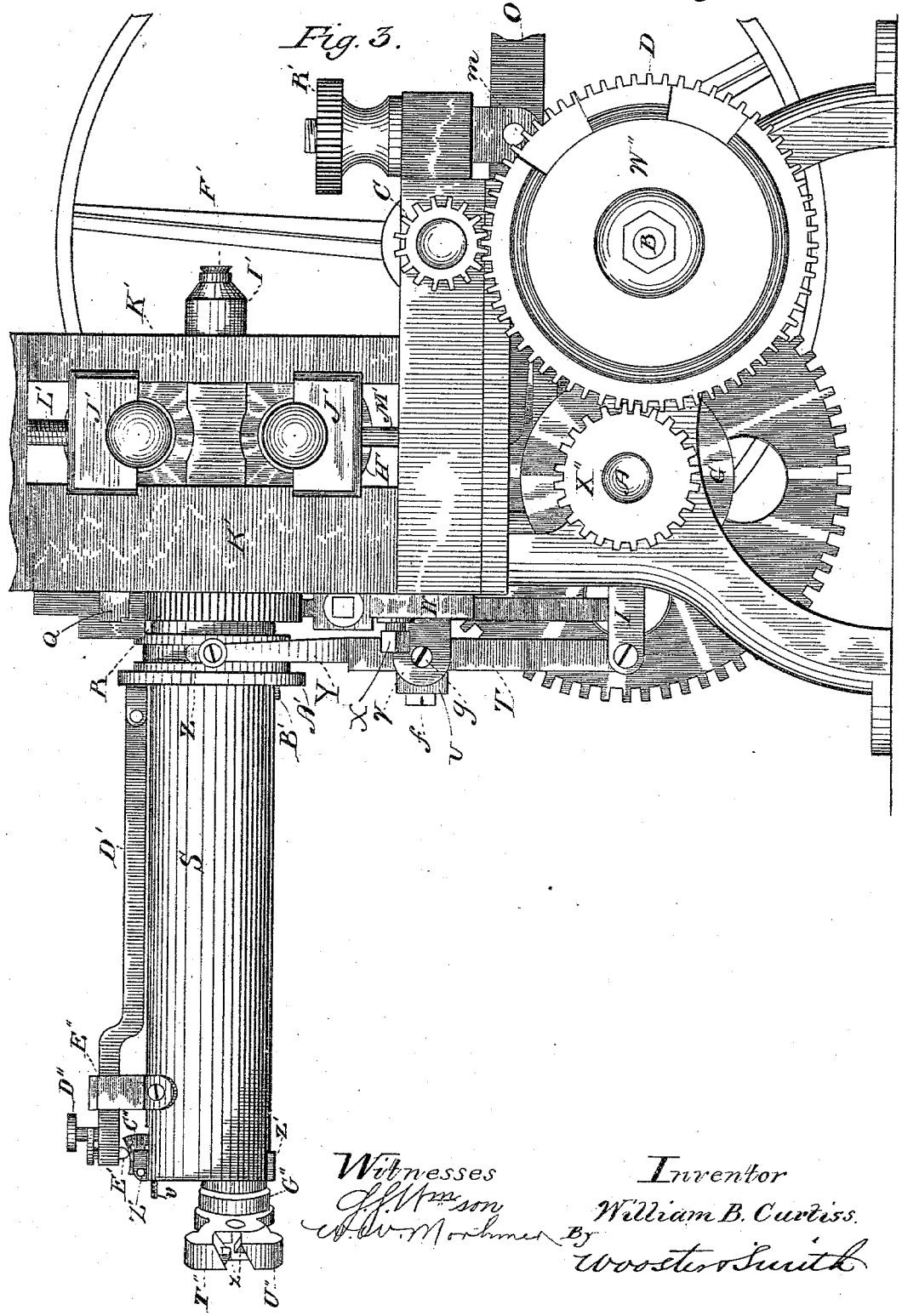
Figure 15:
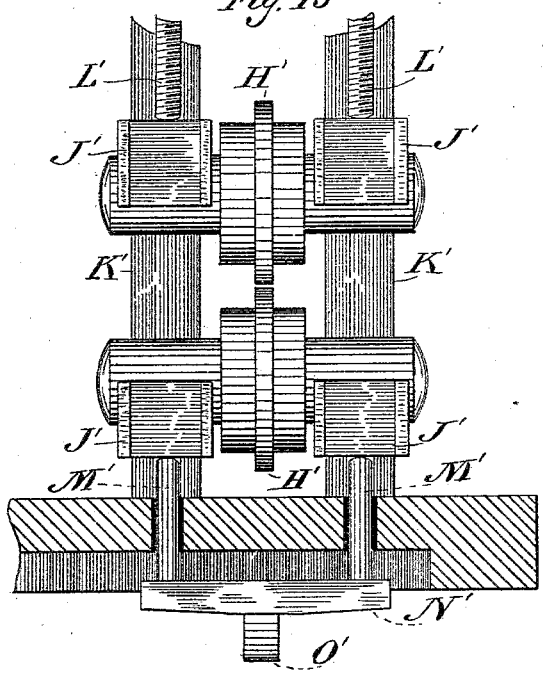
Figure 16:
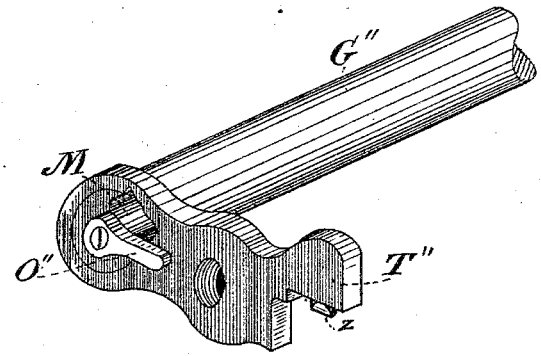
Figure 18:
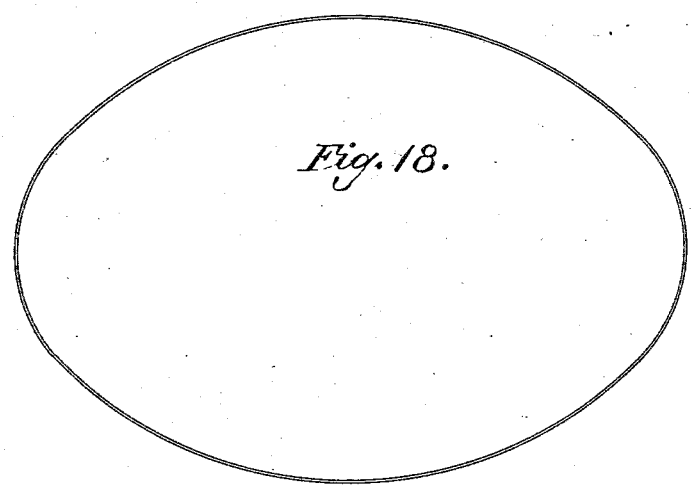
Figure 17:
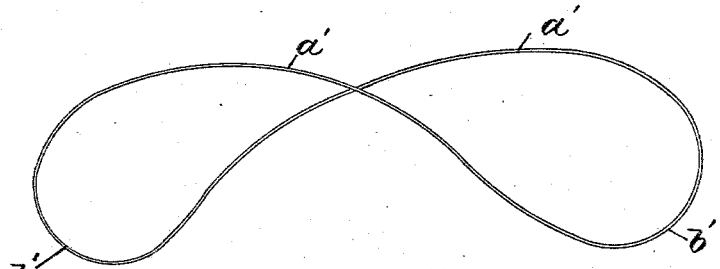
Figure 19:
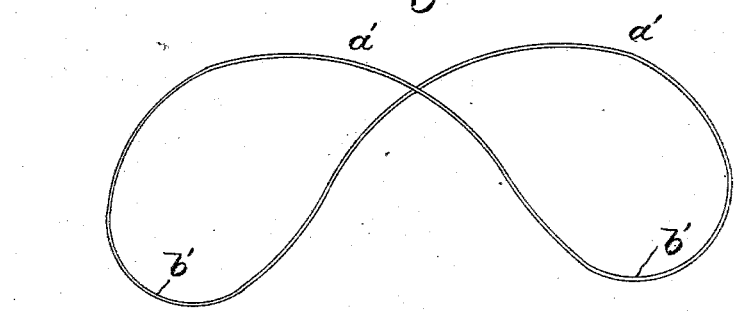

Figure 1 is a front elevation of my improvement, showing the several parts in their operative and relative position. Fig. 2 is a rear elevation of the same; Fig. 3, a side elevation showing the "dwell" mechanism; Fig. 4, a central vertical section; Fig. 5, a detail view of the arm, partly in section; Fig. 6, a bottom view; Fig. 7, a section showing the shear-arm and the operating mechanism; Fig. 8, a detail view of the quill and yoke in their proper relation; Fig. 9, a sectional view similar to Fig. 7, but illustrating the shear-arm on the side opposite to that shown in Fig. 7; Fig. 10, a detail view of the heart-cam and connecting mechanism; Fig. 11, a detail view illustrating the rack and gear; Fig. 12, a similar view, showing the adjustable fulcrum of the lever which actuates the rack and gear; Fig. 13, a detail view of the forward extremity of the sleeve and the several devices that are attached thereto; Fig. 14, a detail view of the forward end of the mandrel and one of the gripping-rolls; Fig. 15, an elevation showing the relation and position of the feed-rolls and the manner of adjusting the same; Fig. 16, a perspective showing the shear-arm and stationary jaw, with the dog which operates the lower jaw projecting therefrom; Figs. 17, 18, and 19, detail views of various forms or shapes of the product of my improvement.

Similar letters denote like parts in the several figures of the drawings.

A is a shaft, to which power is communicated by means of a gear, D, secured to the shaft B. The latter gear is actuated by a cog-wheel, C, on a shaft, to which the power is directly applied by the belt. Secured to this shaft B are two cams, E F, whose functions will be presently explained.

G is a heart-groove cam secured to the shaft A. The groove of this cam is in the inner lateral surface of the cam-wheel, as seen at Fig. 10. Within this groove travels a pin, H, which is attached to a fork, I, embracing the shaft A, that, as the cam G revolves, the fork will be reciprocated in a horizontal plane, as will be understood by reference to Figs. 4 and 10.

J is an ordinary groove-cam secured to the shaft A. Within the groove *a* is a traveler, *b*, secured at the extremity of a lever, K. This lever proceeds upward through a box, L, Figs. 1 and 12, and is rigidly held therein by a set-screw, *c*.

M is a bolt, at one extremity of which is pivoted the box L in such manner that the latter has a rocking motion in a plane at right angles to said bolt. The latter is extended through a vertically-slotted standard, N, and is held at the required elevation therein by means of suitable lock and jam nuts, *d e*.

O is a shoulder on the bolt, between the box L and the standard N, and serves to bind the bolt to the standard when the lock and jam nuts are tightened, while at the same time it performs the function of keeping the box and standard apart. It will thus be readily understood that as the shaft A revolves the lever K will oscillate freely.

P is a connecting-rod, pivoted at one end to the said lever K and at the other to a rack-bar, Q, which meshes into a gear-wheel, R, rigidly secured to a sleeve, S, for the purpose presently explained.

As heretofore set forth, the fork I embraces the shaft A. The outer extremity of said fork is pivoted to a lever, T, which is rigidly secured to a box, U, by means of the set-screw $f$. This box is pivoted by screws $g$ $g$, which are passed through ears V projecting from an adjusting-plate, W. This plate is adjustable by means of bolts X, which pass through slots $h$, and it will be seen that the said bolts and screws $f$ may be loosened and the plate adjusted vertically, thereby changing the position of the box U relative to the lever T. Thus it will be readily understood that the said lever has a reciprocating movement, which may be varied by the vertical adjustment of the said box, which acts as a fulcrum for the lever. The upper portion of this lever is branched or forked, so as to form two arms, Y, at the extremities of which are pivoted shoes Z, which travel in a grooved collar, A', on the sleeve S. This collar is secured as against any rotary movement independent of the sleeve by means of a spline, B', Figs. 4 and 5, on the said sleeve, operating within a recess, C', in the collar, while at the same time a free sliding movement of the latter on said sleeve is permitted. As the shaft revolves the rack Q will mesh into the gear-wheel R, as hereinbefore set forth, which, by reason of its aforesaid rigid connection with the sleeve S, will cause the latter to oscillate around its axis and carry the collar without it; also, the fork I will reciprocate in a horizontal plane, owing to the relations existing between the pin H and the heart-groove cam G, and the lever T will thereby be vibrated on the pivotal points $g$, and the collar A' will accordingly be forced to slide on the spline B', which latter movement is at right angles to the plane of rotation of the sleeve. The two cams G J are so constructed and the functions and operation of the several parts in connection with said cams are such that the two movements of the collar A'—namely, the one longitudinal of and the other oscillatory with the sleeve S—are initially and finally timed so as to give the required bend to the wire. Pivotally attached to this collar is a follower-arm, D', provided at its forward extremity with an adjustable pin, E', the operation of which will be presently explained.

F' is a mandrel secured within the frame of the machine by a bolt, $i$. Around this mandrel the sleeve S is arranged so as to oscillate with the gear-wheel R and at the same time not affect said mandrel. Within this mandrel and extending throughout the entire length is a quill, G', through which the wire is passed. H' are feed-rollers, operated as will be presently explained. In order that these rollers may come in contact with the wire, so as to feed the same, the quill is concaved, as shown at K in Figs. 4 and 8, and to guard against breaking or pulling apart said quill at this portion a yoke, I', is passed over the quill and secured thereto by screws $l$. The yoke is also concaved at its central portion sufficiently to permit of the adjustment and operation of various feeding-rolls. These rolls H' are mounted shafts, which run through journal-boxes J', adapted to slide in housings K'. (See Figs. 2, 3, 4, and 15.)

L' are screw-bolts which operate upon the upper pair of journal-boxes, and thereby adjust the upper feed-roller vertically to bring said roller to the desired plane, as will be more fully described hereinafter.

M' are arms projecting from the lower pair of boxes and connected by a cross-bar, N'.

O' is a lever, pivoted to a vertically-adjustable pin, P'. This pin is passed through an eye, Q', cast integral with or detachably secured to the frame or bed-plate of the machine, and at the upper portion is threaded and a nut, R', screwed thereon. The body of the pin is adapted to move freely within the eye, and the lower extremity is forked, so as to embrace the lever O', which is pivoted thereto, as above stated. At the outer end of the lever is hung a weight, S', the function of which is to force the cross-bar N' upward, and thereby cause the lower wheel, H', to bite against the wire in the same manner as the upper wheel. The operation of these wheels on the wire is such that the lower wheel establishes a constant and uniform bite on the wire, which bite may be increased or decreased by changing the location of the weight S' relative to the fulcrum or pivotal point $m$, and the latter is raised or lowered by operating the nut R', by which operation I am enabled to always keep the lever O' in a horizontal position, so that the weight will not accidentally slip, and this will be readily understood, for if the fulcrum were not vertically adjustable and feed-rolls of greater or less diameter were substituted, the lever, in order to throw the lower feed-roll up to the horizontal plane of the wire, would be raised or lowered at its outer extremity, and accordingly the weight would be apt to slip accidentally, and the pressure of the lower feed-roll against the wire thereby decreased or increased, as the case may be.

T' are grip-rolls, journaled one directly above the other in frames U', which latter are pivoted within the forward end of the mandrel F'.

$n$ $n$ are set-screws, by means of which the said grip-rolls may be adjusted in a vertical plane for the purpose of getting more or less grip on the wire, as will be presently explained.

The forward end of the sleeve S is provided with a vertical opening, V', Figs. 5 and 13, within which are arranged a set of guide-rolls, W', so journaled in frames X' that when the latter are inserted within the opening V' the lower roll will be in advance of the upper one. The roll-frames are provided with shoulders $o$, Fig. 13, and are adapted to fit closely within the opening V'. The rolls are adjusted vertically by means of screws Y', passed through the frames into bearings $p$ in the sleeve S eccentric with said screws, by reason of which a very positive and uniform adjustment is obtained, and the object of this adjustment is to accommodate different sizes of wire and set the rolls so as to embrace the wire properly in their grooves, so that it cannot get out of the same, and may be freely fed forward. The function of these rolls is to afford an intermediate guide for the wire from the gripping-rolls to the bending device, while at the same time they may move freely in a vertical plane around the wire without twisting the latter. By placing the rolls one in advance of the other I am enabled to get two bearing-points on the wire, and this produces grip enough to prevent the wire from buckling or cockling between said rolls and the grip-rolls. By this construction and arrangement of the guide-wheels W' it will be readily understood that any oscillation of the sleeve, as hereinbefore set forth, will likewise affect the said wheels.

Z' is a slide, having pivoted therein what I term a "bending-roll," A'', said slide being adapted to reciprocate in a guideway, B'', at the extreme end of the sleeve. (See Fig. 13.) This slide is shouldered, as seen at $q$, and fits closely within the guideway, so that it has no lateral or horizontal play. $r$ is a pin secured to the sleeve, and projecting within a recess, $s$, in the slide Z'. Within this recess, and resting upon said pin, is a coil-spring, $t$, which acts to hold said slide up in its normal position while the wire is being first introduced between the several rolls.

C'' is a former, which consists in a cam-shaped piece of metal pivoted to the slide Z' at its top, and having a hook-like projection, $u$, extending within the opening V'.

$v$ is a set-screw passing through the face of the slide Z', and abutting against the said hook-like projection of said cam, and operates to change pitch of the latter.

The pin E', hereinbefore mentioned, is vertically adjustable by means of the thumb-screw D'' passing through a lateral extension of said pin into the follower-arm D'. The inner end of said pin rides upon the upper or inclined surface of the former-cam as the follower-arm moves back and forth. This arm is confined as against any upward movement by a stop, E''', secured to the sleeve. By setting the screw $v$ forward the former-cam will be forced more tightly against the follower-pin E', thereby depressing the slide Z', and increasing the pitch of the upper surface of the said former-cam, the result being that the play of the slide Z' is increased below the horizontal plane of the wire. By depressing the follower-pin E' the slide Z' is depressed, and the action or play of the latter is accordingly in a lower plane. In forming or shaping wire the latter is introduced through the quill G' and fed by the feed-rollers H' through the grip-rollers T', and thence between the guide-rolls W' out through the slide Z' and underneath the bending-roll A''. The grip-rollers keep the wire from turning, while the guide-rollers W' have grooves through which the wire runs freely, the object of this being that the guide-rollers during their rotation shall not grip the wire so as to cause the latter to be twisted, and by the term "twisted" I mean acted upon in any manner which would tend to force the grain of the wire in a spiral around its axis. These rollers W' are placed within the sleeve one in advance of the other, as hereinbefore set forth, in order to prevent any cockling or buckling the wire between said rollers and the grip-rollers when the bending-roll is operating on said wires, their principal function being to act merely as intermediate guides to the wire from the grip-rollers to the bending-roll.

I have shown and described my improvement as especially adapted for bending and shaping wire to be used in the brims of hats, and as such the operation of the bending and forming mechanisms is as follows: The wire is fed through the quill and rollers, as hereinbefore described. As the sleeve S oscillates, the arm D' and rollers W' and A'' will be oscillated therewith. During said oscillation the follower-arm D' will have reciprocated, thereby operating the slide Z', as hereinbefore set forth, and causing the wire to be bent down out of its horizontal plane by the bending-roll A'', and during this latter process the wire is bound against the guide-wheels W', and, by the oscillation of the latter and the bending-roll, is bent in a plane laterally diverging from the plane of the former bend. As the wire is fed out the above operation continues with slight modifications as follows: In a wire adapted to be placed in the brim of an ordinary stiff hat there is a rise at the sides and a droop at the ends, as clearly shown in Fig. 17. It will be seen that the curve at the ends is more abrupt than at the sides, and this is caused by carrying the bending-roll A'' farther below the axis of the quill, and with an accelerated movement, the wire being meantime fed out uniformly. Now, as the follower E' travels over that part of the former C'' which has the greater incline or pitch, it will be readily understood that the bending-roll A'' will have a longer and at the same time a quicker slide, and thereby force or bend the wire farther out of line with its axis, as hereinbefore set forth. While the bending-roll is performing this latter operation it is also oscillating, so that during a complete reciprocation of this roll it has operated upon the wire in several planes, no two of which are coincident, the result of this being of course a compound curve. While the follower-pin E' is traveling over the comparatively-straight or less inclined surface of the former C'' both the length and speed of the slide carrying the roll A'' will be lessened, and the wire will accordingly be bent out of line with its axis in a proportionally less degree than in the first instance, thereby forming the more gradual curve, which gives the rise at the sides of the hat. The normal position of the bending-roll is such that its lower periphery is below the horizontal plane of the wire in the quill, and as said wire is made of the best of steel, its resiliency will tend to throw said roll and slide back to their normal position after they have been depressed in the manner aforesaid. It must be borne in mind that the upper surface of the former C″ is curved or inclined more or less, in order to give a variable scope to the slide Z′ at the particular times or intervals, and the contour of said surface determines the nature or degree of the several curves of the wire during the process of bending; and, furthermore, the action of the follower-pin E′ upon the former C″, as described, would, independent of the oscillating movement of the slide Z′, cause the roll A″ to bend the wire into the shape of a simple ellipse, (see Fig. 18,) and thus it will be readily understood that the oscillatory motion of said slide causes the roll A″ to act on the wire toward a right angle in different planes, as hereinbefore set forth, which tend and thereby produce the shape illustrated at Fig. 17. By setting the screw $v$ in, the plate Z is forced down, and the roll A″ will be carried farther below the horizontal plane of the wire, and the pitch of the upper surface of the former increased, which will, during the operation of the machine, cause said roll to curve the wire more abruptly and produce a result similar to that shown at Fig. 19. By setting the thumb-screw D″ down, the bending-roll is brought farther below the horizontal axis of the wire; but the pitch of the upper surface of the former is not changed, and the result is that the wire is bent and formed in a lower plane, the object of which is to bring the ends of the completed ellipse nearer together, so that they can be readily united by a suitable clasp.

The pivoted box U, which is the fulcrum of the lever T, may be raised or lowered, as hereinbefore set forth, which decreases or increases the throw of the follower-arm D′, thereby forming a less abrupt curve in the wire, and also tending to produce a larger ellipse. The extent of the oscillation of the sleeve S is rendered more or less by lowering or raising the swinging box L, which forms the fulcrum of the lever K, and the bending-roll A″ is thereby caused to act on the wire in planes which are nearer at right angles to vertical plane of the ellipse, which of course will give a greater droop to the completed wire, and this will be readily understood by taking into consideration the fact that if the sleeve did not oscillate no droop could be had, and the result would be a simple ellipse in a vertical plane; also, if the plane of action of the bending-roll A″ is inclined toward a horizontal, the tendency would be to form the ellipse in a plane approaching also a horizontal, and as the movement of said roll is in different planes with respect to the horizontal plane of the quill through which the wire is fed, the result is a compound curve in the wire, and therefore the nearer the plane of action of the bending-roll approaches to a horizontal plane the more abrupt will be the curve in the wire at that time, which latter curve gives the droop at the sides of the completed wire as adapted for use in a hat, and by the "droop" of the wire is meant the dip or fall of the curve from the sides $a'$ to the forward or backward portions, $b'$, as seen at Figs. 17 and 19.

I have thus far described the mechanism and operation of the several parts whose functions tend to form and bend the wire. I will now proceed to describe mechanism for cutting the wire after a form or shape has been completed.

F″ is an upright post, (see Fig. 7,) which extends through the bed-plate of the machine, so as to turn freely, and is rigidly secured at its upper end to the shear-arm G″, and at its lower end to an arm, H″, at the extremity of which is a pin which projects within the field of the operation of the cam E. This post is threaded, and a collar-nut, J″, operates thereon. Between the latter and the shear-arm is a coil-spring, K″, which is so arranged relative to said arm that the movement of the latter toward the wire (for the purpose hereinafter explained) will be against the action of the spring, and the latter will accordingly throw said arm back to its normal position.

L″ is a screw-bolt, which serves to prevent any upward displacement of the post F″. The post may be adjusted vertically, and thereby change the horizontal plane of the shear-arm, by simply operating the collar-nut J″ and screw-bolt L″, as will be readily understood. When the cam E, during the revolution of the shaft B, strikes the pin I″, the arm H″ will be thrown outward, thereby swinging the shear-arm G″ inward toward the wire, after the manner of a rock-shaft. After the cam has ceased to operate upon the pin I″ the arm G″ will return to its normal position by reason of the action of the coil-spring K″, as hereinbefore explained. Extending within this shear-arm throughout its length is a rod, M″, (see Figs. 7 and 9,) at the inner end of which is a lug, N″, which projects laterally through said arm. This rod projects at the outer end of the arm, and has secured thereto the dog O″, all of which will be presently explained.

P″ is a bell-crank lever, pivoted to the bed-plate of the machine, as seen at $w$, Fig. 9, and is provided at one extremity with a roll-stud, $x$, and at the other with an adjusting-screw, Q″.

R″ is a tappet extending through a standard, S″, and resting upon the screw Q″, the upper face of said tappet being in contact with the lug N″. The roll-stud $x$ bears against the cam F, and when the latter, during the revolution of the shaft B′, comes in contact with the roll-stud $x$ it will operate the bell-crank lever P″ and throw the tappet R″ upward, thereby causing the lug N″ to turn the rod M″ and throw the dog O″ downward, for the purpose presently explained. At the outer extremity of the shear-arm are arranged the shears, as follows: The upper cutting-jaw, T'', is secured to the shear-arm so as to be stationary, and also not interfere with the movement of the dog O''. (See Fig. 16.) The lower jaw, U'', is pivoted to the upper jaw, and is provided at its heel end with a suitable opening, V'', into which the dog O'' projects, so that any downward movement of said dog will operate to throw the said lower jaw upward and cut the wire, as will be presently explained. The throw of the jaw U'' is determined by the movement of the dog O'', which is regulated by the screw Q''. Should it become desirable that the lower jaw be so thrown that the cutters Z would be beyond each other, the screw Q'' is set up, which operates upon the lug N''' through the medium of the tappet R'', thereby throwing the under jaw nearer to the upper, so that, the stroke of the tappet being always the same, the cutters are thrown beyond each other, the main object of this being to insure the cutting of the wire by forcing the cutters beyond each other, the reverse adjustment of the screw Q'' accomplishing an opposite result.

W'' is what I term a "dwell-wheel," and its diameter is such in relation to that of the wheel X'' that the shaft actuated by the latter revolves twice during the revolution of the shaft actuated by the former, and the several cams on these shafts will of course operate accordingly. Again, the relation existing between the wheels Y'' and Z'' is such that the latter revolves twice as fast as the former, and therefore the wheel Z'' revolves four times during one revolution of the dwell-wheel, and the wheels A''' have the same speed as the wheel Z''. The axles of the wheels A''' and of the feed-roller H' terminate at their inner extremities in knobs B''', which are connected in horizontal pairs by ordinary shackle-bars, C''', (see Fig. 1,) so that any motion transmitted to the wheels A''' will be imparted to the said feed-rollers. When the feed-rollers are adjusted as hereinbefore set forth, the shackle-bars are removed and are readily replaced when the desired adjustment is obtained. Thus it will be clearly seen that when the shaft B has made one revolution the feed-rollers will have revolved completely four times. The friction of the said rollers upon the wire being constant and uniform, as hereinbefore set forth, it follows that the amount of wire fed for the completion of a single form for a hat is equal to four times the circumference of either feed-roller. As will be readily understood from the foregoing, the dwell-wheel W'' makes but a single revolution during the forming and completion of a hat-wire. The gear on this wheel W'' is mutilated for a short distance, as shown at Fig. 3, and these mutilations are so located that when the wire is formed and completed they will come opposite to the geared wheel X'', and the motion of the latter will immediately cease, which will likewise cause a cessation of the functions of every part of the whole machine, with the exception of the shaft B and the cams thereon. The arrangement of the said cams is such that the cam E will strike the pin I'' a trifle sooner than the cam F will operate on the roll-stud $x$, in order that the shear-arm may be brought into the proper position before the cutters are operated. The mutilation of the gear of the wheel W'' is so located that it does not affect the action of the gear C, and at the same time the extent of said mutilation is such that when the wire has been cut the wheels X'' and W'' immediately mesh again, and the machine operates as before.

In arriving at the desired result, the several steps or functions of my improvement are as follows: The wire is fed in and shaped by the bending-rolls, as described. The timing of the movement of these rolls is such that the wire will be completely formed when the feed-rollers have revolved four times. The feeding and bending of the wire now ceases, owing to the mutilated gear on the dwell-wheel W'' and its effect on the wheel X'', as before described. The shaft B alone revolves, and the cam E strikes the pin I'' and swings the shear-arm G'', so that the cutters Z will assume a position above and below the wire. The cam F now operates the tappet R'', and thereby causes the said cutters to sever the wire. The amount of wire to be used in forming the required shape for the hat depends, of course, on the size of the feed-rollers, and should a larger or smaller size of the form be desired, a greater or less amount of wire is fed out, and this is accomplished by simply substituting feed-rollers of a greater or less circumference.

I have described my improvement as especially adapted for round wire, in which case no torsion of the wire is caused; but I am enabled to accomplish the same results with flat wire by simply placing the guide-rolls W' one directly above the other and adjustably securing them, so that they will act as grip-rolls in precisely the same manner as the rolls T'. I am enabled to form the wire initially in a more or less horizontal plane by simply adjusting the gear-wheel R around its axis, so that the normal position of the slide Z' is not in a vertical plane, as shown, the object being to dispense with the adjustment of the shear-arm, if desired, by bringing the wire itself within the plane of operation of the cutters; also, the cutter may be readily adjusted vertically or removed for the purpose of sharpening. Thus it will be seen that I can produce a wire formed especially for the brims of hats in which there is a droop or gradual fall of the curve from the sides to the front and back, and that the degree of said droop or curve may be readily varied.

I do not wish to confine myself to the manufacture of wire into forms and shapes suitable for use in the brims of hats, as it will be readily understood from the foregoing description that the several adjustments and combinations of the follower and former, together with the variable oscillation of the sleeve and throw of the follower-arm, enable me to curve, shape, or bend wire into almost any conceivable shape.

Having thus described my invention, what I claim as new, and desire to secure by Letters Patent, is—

1. In a machine for bending and shaping wire, the bending devices constructed and arranged to be oscillated around the wire, substantially as set forth.

2. In a machine for bending and shaping wire, the bending devices capable of being oscillated around the wire, in combination with means for oscillating said devices, whereby they are caused to act on the wire in different planes, substantially as shown and described.

3. In a machine for bending and forming wire, the bending devices capable of oscillating around the wire and means for oscillating them, in combination with mechanism for feeding the wire, whereby said bending devices are caused to act on the wire in different places, substantially as set forth.

4. In a machine for bending and forming wire, bending devices, substantially as described, capable of oscillating about the wire, in combination with means for oscillating and means for operating said devices, for the purpose set forth.

5. In a wire bending and forming machine, the bending devices arranged in the path of the wire as it leaves the gripping device, in combination with the gripping device and means for oscillating and means for operating said bending devices in planes intersecting said path of the wire, substantially as described.

6. The combination, with a gripping device, a guiding device, and bending device, and means for operating the latter in planes at different angles to the horizontal plane of the quill, of means for determining the pitch of the curve of the wire, substantially as set forth.

7. The combination, with a feeding device, a gripping device, and a guiding device, of a bending device adapted to act on the wire in planes at different angles to the horizontal plane of the quill, and an adjustable former pivoted to said bending device, and means for operating said former, substantially as described.

8. The combination, with an adjustable former and means for operating the same, of a bending device adapted to act on the wire in planes at different angles to the horizontal plane of the quill, substantially as shown and described.

9. The reciprocating follower-arm and follower, in combination with the former, a bending device, a guiding device, and a gripping device.

10. In a wire bending and forming machine, the bending-roll and former, in combination with the reciprocating follower-arm, having adjustable follower attached thereto, and bending devices, substantially as set forth.

11. The gripping-rolls supported in pivoted adjustable frames, in combination with the adjustable guide-rolls and bending and forming devices.

12. In a wire bending and forming machine, the combination, with a former pivoted within a bending device adapted to act on the wire in planes at different angles to the horizontal plane of the quill, of feeding devices and means for adjusting the incline of the upper surface of the former, whereby the horizontal plane of the bending-roll is varied, thereby producing a more or less abrupt curve in the wire, substantially as described.

13. The guide-rolls and bending-roll, adapted to oscillate with the sleeve, in combination with the stationary grip-rolls and means for feeding the wire.

14. In a wire bending and forming machine, an adjustable follower attached to a reciprocating arm, in combination with a former pivoted within a bending device which moves in planes at different angles to the horizontal plane of the shear-arm, whereby the bending-roll is caused to act in a lower plane, as and for the purpose set forth.

15. The stationary mandrel supporting the gripping-rolls, and having interiorly arranged therein the quill through which the wire is fed, substantially as described.

16. In a wire bending and forming machine, the quill having a central longitudinal opening for the wire, and concaved, as shown, to accommodate the feed-rolls, in combination with the strengthening-yoke adapted to the curvature of the feed-rolls, whereby the said rolls may operate on the wire in the quill, substantially as set forth.

17. In a machine for bending and forming wire, the stationary mandrel having the quill arranged interiorly therein, said quill having a central longitudinal opening for the wire, and concaved, as shown, in combination with the adjustable feed-rolls, substantially as described.

18. In a machine for bending and forming wire, the rack adapted to receive motion from an oscillating lever, in combination with a gear-wheel rigidly attached to the sleeve, and the bending devices, whereby the plane of these devices relative to the horizontal plane of the quill is varied, substantially as shown and described.

19. The oscillating sleeve carrying the guide-rolls and bending devices, in combination with the mandrel, quill, and grip-rolls, substantially as set forth.

20. The collar oscillating with the sleeve and the follower-arm attached thereto, in combination with a former and bending device, and means for reciprocating said collar.

21. The oscillating sleeve, the reciprocating collar, and the follower-arm attached thereto, in combination with the gear and rack, the former, and the bending devices, substantially as described.

22. The rack and gear attached to the sleeve, in combination with an actuating-lever having an adjustable fulcrum, whereby the throw of said rack is regulated, thereby increasing or decreasing the oscillation of the sleeve, and the bending devices and means for operating the same, substantially as and for the purpose set forth.

23. The collar having attached thereto the follower-arm, in combination with an actuating-lever having an adjustable fulcrum, whereby the reciprocation of said arm is regulated, thereby increasing or decreasing the play of the follower, and with the former and the bending devices, substantially as described.

24. The bending device, in combination with mechanism for regulating the oscillation of the sleeve, whereby the plane of action of the said device relative to the horizontal plane of the quill may be varied, substantially as set forth.

25. The oscillating sleeve having attached therein the bending devices and guide-rolls, in combination with the reciprocating collar having the follower-arm pivoted thereto, the adjustable former, gripping-rolls, a stationary mandrel with quill therein, and feeding devices, substantially as and for the purpose herein set forth.

26. The shear-arm having attached at its outer extremity the jaws and cutters, and adapted to be swung into operative position, substantially as set forth.

27. The shear-arm having attached at its outer extremity the jaws and cutters, and adapted to be swung into operative position, in combination with mechanism for operating the jaws, substantially as shown.

28. The rod arranged within the shear-arm, and adapted at its outer end to operate the jaws, the inner end being connected with mechanism for operating said rod, substantially as described.

29. The combination of the shear-arm, shear-jaws attached thereto, and means for swinging the arm into operative position, and means for actuating said shear-jaws, with means for feeding and forming the wire, substantially as described.

30. The shaft A, carrying cam J, in combination with the lever K, attached to rack-bar Q, sleeve S, having gear R, and bending devices secured within said sleeve, substantially as set forth.

31. The shaft A, carrying cams G J, in combination with the lever K, attached to rack-bar Q, sleeve S, having gear R, and bending devices secured within said sleeve, fork I, having pin H, lever T, with arms Y, collar A', follower-arm D', with follower-pin E' attached thereto, and former C'', substantially as described.

32. The shaft A, carrying a heart groove cam, G, in combination with a fork, I, having a pin traveling in said groove, the lever T, pivoted to the fork, and having arms Y, collar A', follower-arm D', former C'', and bending devices, substantially as set forth and described.

33. The shaft B, carrying cam E, in combination with the arm H'', the upright post F'', secured at the lower end to said arm and at the upper end to the shear-arm, collar-nut J'', spring K'', bolt L'', and cutting-jaws T'' U'', and means for operating the same, substantially for the purpose set forth.

34. The shaft B and cam F, in combination with the bell-crank lever P'', tappet R'', cutter-jaws, and mechanism for operating the jaws, substantially as set forth.

35. The shaft B, carrying the cams E and F, in combination with the arm H'', the upright post F'', spring K'', shear-arm G'', bell-crank lever P'', tappet R'', cutter-jaws T'' U'', and mechanism for operating the jaws, substantially as herein shown and described.

36. The shaft B, carrying cams E and F, in combination with mechanisms for operating the shear-arm and cutting-jaws, whereby the said arm is swung into the proper operative position and the cutting-jaws operated, substantially as set forth.

37. The shaft B, carrying the cams E F, the former set slightly in advance of the latter, in combination with the arm H'', post F'', shear-arm, and cutter-jaws, and means for operating said jaws, substantially as described.

38. The bell-crank lever P'', operated by the cam F, and having adjusting-screw Q'', in combination with the tappet R'', arm M'', having lug N'', cutting-jaw U'', and stationary jaw T'', substantially as described.

39. The arm H'', operated by cam E, and adjustably connected to upright threaded post F'', secured to the shear-arm, in combination with the collar-nut J'' and screw-bolt L'', whereby the horizontal plane of said shear-arm is regulated, for the purpose set forth.

40. The shear-arm having a jaw rigidly attached thereto, in combination with a pivoted jaw, a rod passing through said arm, and having a dog secured at the outer extremity for actuating the pivoted jaw, and means for operating said rod, substantially as described.

41. The shear-arm having jaw T'' rigidly secured thereto, and having interiorly arranged therein the rod M'', provided at its outer extremity with dog O'' and at its inner extremity with lug N'', in combination with the pivoted jaw U'', tappet R'', and means for operating the latter, substantially as shown and described.

42. The mutilated drive-wheel W''', mounted on shaft B, carrying cams which operate the shear-arm and cutting devices, in combination with the wheel X'', mounted on the shaft A, which carries the cams that operate the oscillating and bending devices, and the mechanism which operates the feeding devices, substantially as and for the purpose set forth and described.

43. The shaft A, carrying the gear-wheels X'' and Y'', and means for operating the bending devices, in combination with gears Z″ J″, shackle-bars C‴, feed-wheels, bending devices, and mechanism for transmitting movement to the latter, substantially as set forth.

44. The wheel X″, mounted on shaft A, which carries mechanism for operating the bending and feeding devices, in combination with said devices and mechanism for transmitting movement to them, mutilated wheel W″, mounted on the shaft B, which carries mechanism for operating the cutters and the cutting devices, and means for transmitting movement to them, substantially as described.

45. The lever O′, pivoted to the vertically-adjustable pin P′, secured to the bed-plate of the machine, in combination with the feed-wheels and the sliding weight S′, arranged on said lever, substantially as set forth.

In testimony whereof I affix my signature in presence of two witnesses.

WILLIAM B. CURTISS.

Witnesses:
GEORGE A. KINNER,
F. W. SMITH, Jr.